Patented Nov. 22, 1938

2,137,904

UNITED STATES PATENT OFFICE 2,137,904

CASING MATERIAL

Charles T. Walter, Chicago, Ill., assignor to Industrial Patents Corporation, Chicago, Ill., a corporation of Delaware No Drawing. Application December 12, 1936, Serial No. 115,534

6 Claims. (Cl. 99—176)

This invention relates to artificial sausage casings.

One of the objects of the invention is to provide a method for the preparation of artificial casings.

Another object of the invention is to provide a novel artificial sausage casing which is inexpensive to manufacture and which provides a satisfactory substitute for animal casings.

Cloth tubes and cloth sacks have been used from time to time for the manufacture of sausage meat packages. It is well known that cellulose casings made of transparent cellulose tubing are satisfactory for sausage casings with certain types of product.

The objections to the use of fabric in the manufacture of a sausage casing are inherent in the material. If the fabric is of sufficient weight and closeness of weave to provide an effective casing, it is not readily sliceable with the meat. If the fabric is light in weave and loosely woven, meat tends to ooze through the interstices. Consequently, fabric casings have been limited to heavy fabrics which must first be removed in whole or in part before the sausage meat is sliced.

The present invention contemplates the manufacture of a synthetic sausage casing employing fabric of close weave but of a character which may be readily cut with the implement used in slicing the meat.

In the preparation of the preferred embodiment of this invention, a tube is prepared from fabric sufficiently heavy and closely woven to obviate the objections inherent in loosely woven fabric for this purpose.

Muslin is a satisfactory fabric for the purpose. Although muslin is of a weave which lends itself well to the preparation of sausage casings, the strength of the threads is such as to prevent muslin from being adopted for this purpose. The present invention contemplates reducing the strength of the muslin either before or after it is formed into a tube by immersing the muslin in a relatively weak, warm solution of sodium hypochlorite. A few minutes immersion is sufficient to greatly reduce the mechanical strength of the threads. The extent of the weakening of the fiber depends upon three factors, namely, the strength of the solution, the temperature of the solution, and the time of treatment, and may be readily controlled by variation of these factors.

I have found cloth treated in this manner to be a satisfactory base for sausage casings of the type described and claimed in my copending application entitled Artificial sausage casings, Serial No. 23,666, filed May 27, 1935, and permits the use of relatively closely woven fabrics in the preparation of casings prepared with a fabric base and a coating of regenerated cellulose.

In preparing casings of the latter type in accordance with the present invention, a relatively closely woven cloth is used and treated, as has been described, with sodium hypochlorite. After the fiber tubing is formed, it is coated on the outer surface with cellulose viscose which is treated so as to regenerate substantially pure cellulose from the cellulose viscose as by immersion in a suitable regenerating bath such as a solution of sodium sulphate acidified slightly with sulphuric acid. I have found that a thin coating of cellulose viscose results in a more or less suede finish on the finished casing since the film of cellulose viscose follows the microscopic contour of the surface of the fabric. A thick coating of cellulose viscose when so treated becomes quite flat and smooth and reflects light in such a manner as to give a glossy effect.

It will be understood, of course, that both sides of the base fabric may be coated with cellulose viscose. However, I have found that it is more satisfactory to coat only the outside of the finished casing as the uncoated fabric on the inside adheres well to the sausage meat after the sausage is processed and sliced, peeling away in the fashion of a natural sausage casing. The film of cellulose resulting from the regeneration treatment of the cellulose viscose layer on the outside affords protection and renders the casing impervious to the meat.

I have found that casings prepared in accordance with the method hereinbefore described possess the desirable properties of both animal sausage casings and artificial sausage casings. They may be wetted by water, stretch somewhat, adhere firmly to the meat, permit proper curing of the meat, permit transmission of smoked flavor, are easily colored artificially, and are mechanically strong.

I claim:

1. The method of preparing sausage casings which comprises preparing a fabric tube from closely woven fabric and chemically weakening the fibers of the fabric.

2. The method of preparing sausage casings which comprises preparing a fabric tube from closely woven fabric and weakening the fibers of the fabric by treatment with sodium hypochlorite.

3. The method of preparing casings which comprises weakening a fiber tube with sodium hypochlorite, coating the weakened tube with cellulose viscose, and regenerating substantially pure cellulose from the cellulose viscose.

4. The method of preparing a sausage casing which comprises chemically weakening the fibers of a closely woven fabric and forming a tube from the weakened fabric.

5. The method of preparing a sausage casing which comprises weakening the fibers of a closely woven fabric by treatment with sodium hypochlorite and forming a tube from the weakened fabric.

6. The method of preparing a sausage casing which comprises weakening the fibers of a fabric by treatment with sodium hypochlorite, forming a tube from the weakened fabric, coating the tube with cellulose viscose and regenerating substantially pure cellulose from the cellulose viscose.

CHARLES T. WALTER.